United States Patent [19]
Berkcan et al.

[11] Patent Number: 5,212,392
[45] Date of Patent: May 18, 1993

[54] OPTICAL SENSING APPARATUS FOR DETECTING LINEAR DISPLACEMENT OF AN OBJECT AND METHOD OF OPERATION THEREOF WITH DETECTOR MATRIX AND CENTROID DETECTION

[75] Inventors: Ertugrul Berkcan; Chung-Yih Ho; Jerome J. Tiemann, all of Schenectady; Fathy F. Yassa, Clifton Park, all of N.Y.

[73] Assignee: General Electric Company, Schenectady, N.Y.

[21] Appl. No.: 806,507

[22] Filed: Dec. 13, 1991

[51] Int. Cl.⁵ ............................................. G01N 21/86
[52] U.S. Cl. .................................. 250/561; 250/206.1
[58] Field of Search ...................... 250/561, 560, 206.1, 250/206.2, 203.2, 208.2, 231.1, 231.13, 231.12, 211 K; 356/141, 152

[56] References Cited
U.S. PATENT DOCUMENTS

| | | | |
|---|---|---|---|
| 3,173,019 | 3/1965 | Wormser | 250/232 |
| 4,065,860 | 1/1978 | Linton et al. | 35/25 |
| 4,114,035 | 9/1978 | Herzog | 250/211 K |
| 4,181,851 | 1/1980 | Allen et al. | 250/203 R |
| 4,211,922 | 7/1980 | Vaerewyck et al. | 250/203 R |
| 4,291,977 | 9/1981 | Erdmann et al. | 356/152 |
| 4,299,103 | 10/1980 | Hipp | 356/141 |
| 4,314,761 | 2/1982 | Reymond et al. | 356/141 |
| 4,315,690 | 2/1982 | Trocellier et al. | 356/152 |
| 4,625,108 | 11/1986 | Nestel et al. | 250/227 |
| 4,709,146 | 11/1987 | Reitsema | 250/231.14 |
| 4,711,579 | 12/1987 | Wilkinson | 356/375 |
| 4,767,209 | 8/1988 | Johnson | 356/152 |
| 4,792,698 | 12/1988 | Pryor | 356/376 |
| 4,893,025 | 1/1990 | Lee | 250/561 |
| 4,912,337 | 3/1990 | Wilwerding | 250/560 |
| 4,950,899 | 8/1990 | Tachibana | 250/211 K |

Primary Examiner—David C. Nelms
Attorney, Agent, or Firm—Marvin Snyder

[57] ABSTRACT

Apparatus for sensing linear displacement of an object between first and second locations along an axis is used to sense conditions that can be made to vary displacement of an object in accordance with the condition, such as temperature, pressure and rotary motion. A light beam projected along an incident light path to the object is reflected along a reflective light path by a reflector affixed to the object. A photo-sensor array in the reflective light path intercepts the reflected light beam and produces samples of the intensity of the reflected image at multiple positions along a line across the array. An imager coupled to the array converts the light samples to representative electrical samples. The resultant light intensity information is provided to an electronic processor which determines a first centroid of the reflected image when the object is at a first location and a second centroid when the object is at a second location, and employs the difference between the first and second centroids to determine the displacement of the object.

13 Claims, 8 Drawing Sheets

OPTICAL SENSING APPARATUS FOR DETECTING LINEAR DISPLACEMENT OF AN OBJECT AND METHOD OF OPERATION THEREOF WITH DETECTOR MATRIX AND CENTROID DETECTION

BACKGROUND OF THE INVENTION

This invention relates in general to sensing devices for measuring displacement of an object between first and second locations and, more particularly, to nonintensity-based sensing devices for measuring such displacement via optical techniques.

Many types of sensors rely on the ability of the sensor to measure linear displacement of an object in order to indirectly indicate changes in variables other than displacement itself. For example, pressure, temperature, torque and other types of sensors can function in this manner by using bi-metal strips, diaphragms and other structures to translate the sensed variable into a measurable displacement.

Modern electronic control systems for aircraft engines require that such sensors interface with electronic engine control circuitry. As the number of engine parameters which are monitored and controlled has significantly increased in advanced engine control systems, the demand for measurement accuracy from sensor devices has correspondingly grown dramatically. Unfortunately, to meet the demand for increased accuracy from such sensors, their complexity, cost, size and weight have undesirably tended to increase. Increasingly complex sensors are likely to be more susceptible to contamination than their earlier less complex counterparts.

SUMMARY OF THE INVENTION

Accordingly, one object of the present invention is to provide a sensing apparatus which measures displacement of an object with high accuracy and with relatively low complexity, size and weight.

Another object of the invention is to provide a sensing apparatus which measures displacement of an object by a nonintensity-based optical technique that is substantially resistant to electromagnetic interference (EMI).

Yet another object of the invention is to provide a sensing apparatus which measures displacement of an object in harsh operating environments (i.e., high temperature, high vibration, or a combination thereof) in a highly reliable fashion.

Still another object of the invention is to provide an optically-based displacement sensing apparatus which is resistant to contamination and other factors affecting intensity of light employed thereby.

Briefly, in accordance with a preferred embodiment of the invention, a sensing apparatus for detecting linear displacement of an object between first and second locations along an axis includes a light source for projecting an incident light beam along an incident light path to the object, and a reflector affixed to the object to reflect the incident light beam as a reflected light beam along a reflective light path. A photo-receptor array is located in the reflective light path such that the reflected light beam impinges on the array. A centroid determining apparatus is coupled to the photo-receptor array for determining a first centroid of the reflected light beam impinging on the photo-receptor array when the object is situated in the first location and for determining a second centroid of the reflected light beam impinging on the photo-receptor array when the object is displaced to the second location. An electronic calculation processor, responsive to the centroid determining apparatus, is provided for calculating the displacement of the object between the first and second locations by taking the difference between the first and second centroids.

BRIEF DESCRIPTION OF THE DRAWINGS

The features of the invention believed to be novel are specifically set forth in the appended claims. However, the invention itself, both as to its structure and method of operation, may best be understood by referring to the following description and accompanying drawings in which:

DETAILED DESCRIPTION OF THE INVENTION

Figure 1:
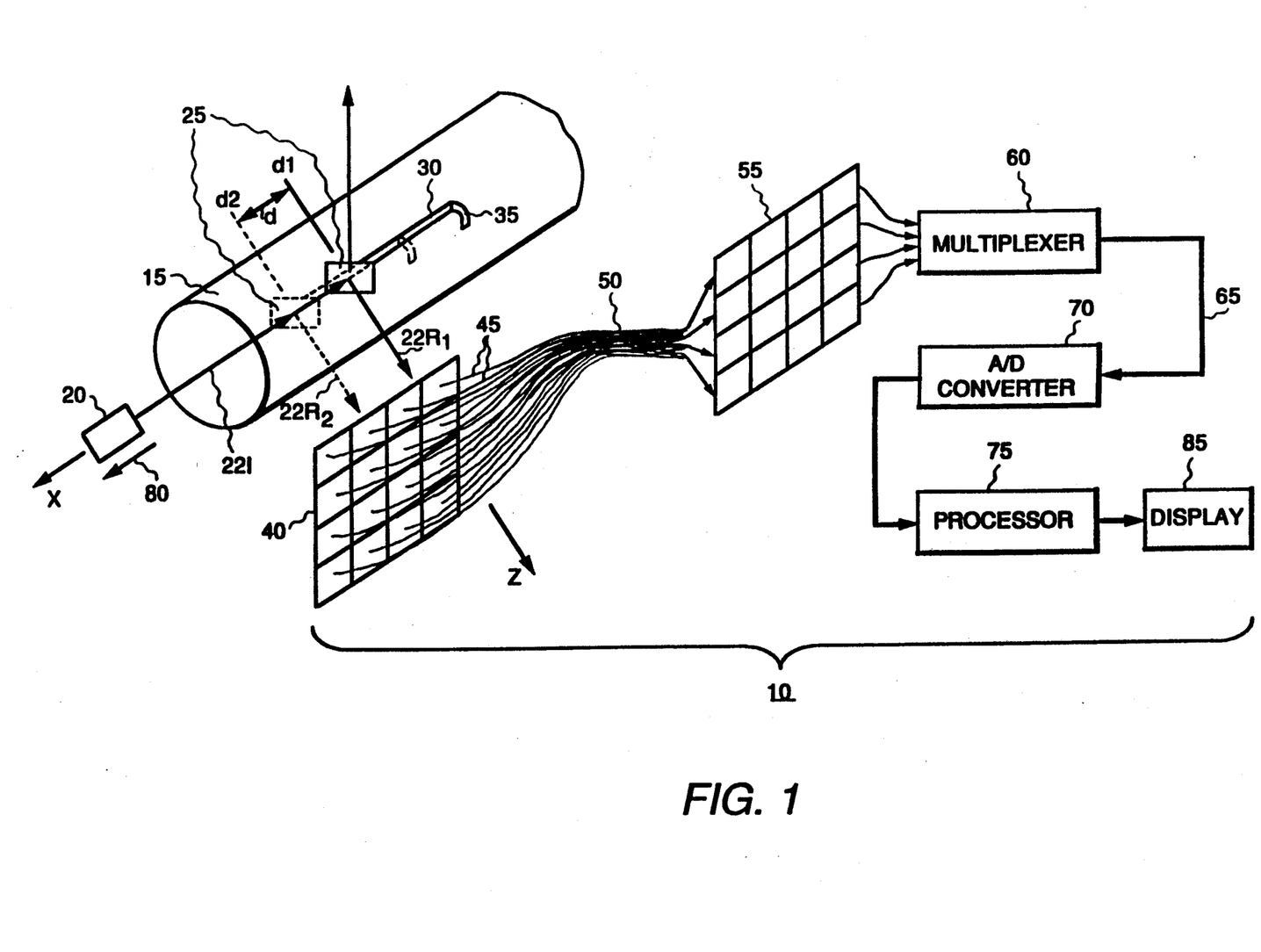
FIG. 1 is a part schematic and part block diagram of one embodiment of the displacement sensing apparatus of the present invention.

The invention, as shown in FIG. 1, includes linear displacement sensing apparatus 10. Sensing apparatus 10 is employed to detect linear displacement of an object 15 moving along a predetermined axis, for example the X axis shown in FIG. 1. In this embodiment, object 15 is depicted as a cylindrical shaft, although it will be appreciated that the teachings herein apply equally as well to detecting linear displacement of virtually any object which moves along a predetermined axis. Sensing apparatus 10 includes a stationary light source 20 oriented with respect to object 15 such that light ray 22I (the incident ray) from source 20 impinges upon a reflective planar mirror 25 attached to a shaft 30 which is fixedly mounted to object 15 by a mounting structure 35. Thus, as object 15 moves along the X axis, mirror 25 affixed to object 15 correspondingly also moves along the X axis.

A photo-receptor array 40, which is optically coupled to optical fibers 45, is situated adjacent object 15 such that incident light ray 22I is reflected by mirror 25 as light ray 22RI (the reflected ray) onto array 40. The individual photo-receptors, or photo-sensor elements, are sufficiently closely spaced that a plurality thereof are always illuminated by the reflected ray regardless of the position of reflector 25 along the X axis between two predetermined positions d1 and d2. The ends of the optical fibers 45 which terminate at array 40 are arranged into an X-Y matrix of elements or grid pattern as indicated in FIG. 1. The optical fiber ends are regularly spaced at a distance j apart from each other in array 40. In a Cartesian coordinate system, photo-receptor array 40 is situated in the X-Y plane defined by Z=z. Optical fibers 45 are gathered into a bundle 50 and coupled to a two-dimensional imager 55 which converts the light signals carried by fibers 45 into an electrical representation of the reflected image impinging on array 40. Imager 55 takes the optical signals from each of fibers 45 and converts them into respective electrical signals representing intensity of the reflected image on each of the elements of grid array 40. These respective electrical signals produced by imager 55 are designated "array sample signals", each array sample signal corresponding to the reflected light intensity sensed at a respective element of array 40.

A multiplexer 60 is coupled to imager 55 to multiplex the array sample signals The multiplexed array sample signals thus produced are transmitted over a common signal path 65 to an analog to digital (A/D) converter 70. A/D converter 70 converts the received analog signals to digital representations thereof, thus producing digital array sample signals at its output.

A/D converter 70 is coupled to an electronic processor or computer 75 which is capable of performing mathematical calculations. In a manner described in more detail subsequently, processor 75 first calculates the centroid of the reflected light image formed on array 40 when mirror 25 and object 15 are in a first location along the X axis identified as position X=d1.

For purposes of this example, it is assumed that object 15 now moves in the direction indicated by arrow 80 along the X axis such that mirror 25 is displaced to a second position X=d2. Then, a predetermined amount of time after performing the first calculation of the centroid of reflected light image $22R_1$ as described above, processor 75 performs a second calculation of the centroid of reflected light image $22R_2$ impinging on array 40. Processor 75 determines the difference between the first and second centroids to find the displacement d, where d=d1−d2. The displacement of the centroid from the first position to the second position is in one-to-one correspondence with the displacement of the object in question. (In the illustration of FIG. 1, to help distinguish the reflected light ray produced when object 15 is in the second position indicated by mirror 25 at X=d2 from the reflected light ray produced when object 15 is in the position indicated by mirror 25 at X=d1, light ray $22R_2$ is shown as a dashed line and mirror 25 is similarly represented by dashed lines when in the second position. This aids in depicting movement of mirror 25 between the first and second positions. However, to avoid undue complexity in FIG. 1, object 15 and shaft 30 have not been redrawn with corresponding dashed lines to indicate their movement to the second position.)

In one embodiment of the invention, a display device is coupled to processor 75 to indicate to a user the displacement of object 15 between the first and second positions. Alternatively, the output of processor 75 provides a displacement signal which is supplied as an input signal to a control system (not shown) responsive to the signal.

In the above described embodiment of the invention, the photo-sensor elements of optical fiber array 40 detect the light image reflected from mirror 25. In an alternative embodiment of the invention, optical fiber array 40 is replaced by an XY array of photo-diodes which sense the reflected image and convert the image directly to an electrical signal. More particularly, each diode of such photo-diode array senses a portion of the image and converts that portion to a respective electrical signal. These electrical signals which represent the reflected image are processed by multiplexer 60 in substantially the same manner described earlier.

Figure 2:
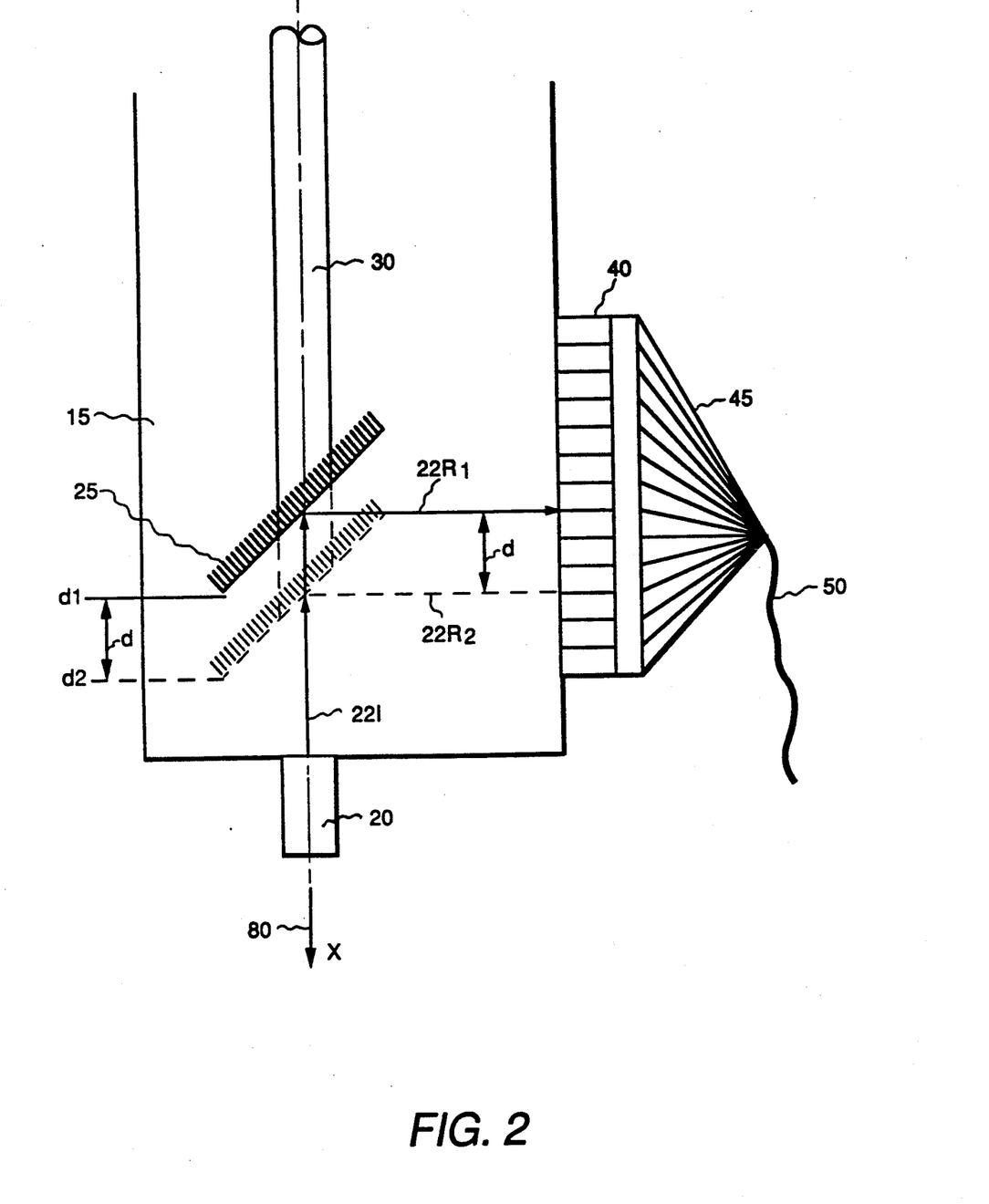
FIG. 2 is a simplified schematic representation of the embodiment of the invention shown in FIG. 1, including a planar mirror reflector.

FIG. 2 is a simplified schematic view of a portion of the above described embodiment of the invention, which is provided as a basis for comparison with subsequently described embodiments. For example, in the embodiment shown in FIG. 3, a spherical mirror 125 is substituted for planar mirror 25 of the embodiment of FIGS. 1 and 2. In comparing the embodiment of FIG. 3 with the embodiment of FIGS. 1 and 2, like numerals are used to indicate like elements.

Figure 3:
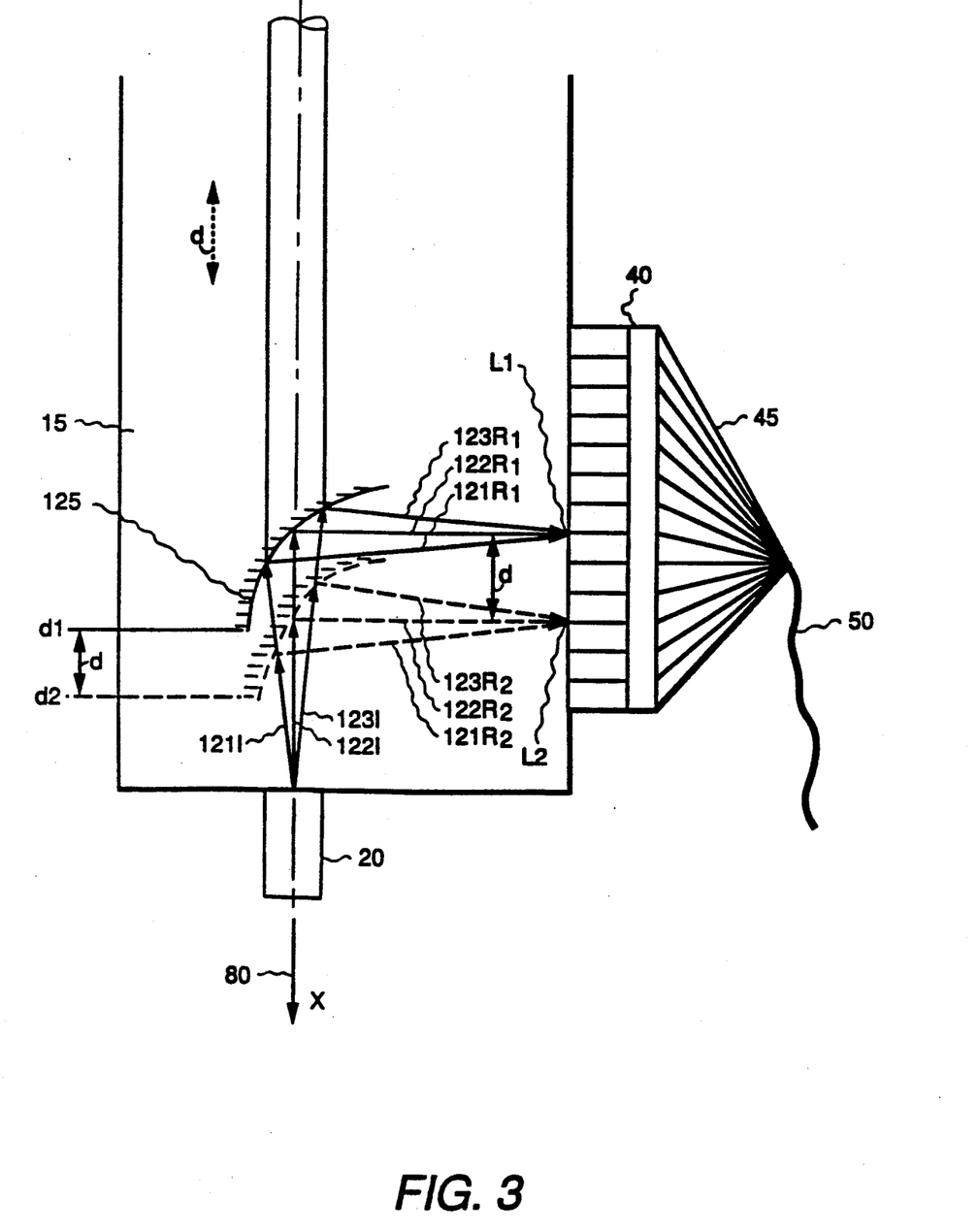
FIG. 3 is a simplified schematic representation of another embodiment of the sensing apparatus, including a spherical mirror reflector.

In the spherical mirror embodiment of the invention as shown in FIG. 3, light source 20 is depicted as producing incident light rays 121I, 122I and 123I which impinge on spherical mirror 125 of object 15. When mirror 125 of object 15 is situated in the first position, defined as X=d1, these incident light rays are reflected from the mirror as reflected light rays $121R_1$, $122R_1$ and $123R_1$. The reflected image thus impinges on array 40 substantially at a locus L1. The first centroid of the reflected image at locus L1 is determined by processor 75 (FIG. 1) in the manner described earlier.

It is again assumed that object 15 is in motion along the X axis in the direction indicated by arrow 80 in FIG. 3. Mirror 125 of object 15 moves to a second location, defined as X=d2. The incident light rays 121I, 122I and 123I that impinge on mirror 125 are reflected as light rays $121R_2$, $122R_2$ and $123R_2$, respectively. The reflected image now impinges on array 40 substantially at locus L2. The second centroid of the reflected image at locus L2 is now determined by processor 75 (FIG. 1). Again, processor 75 calculates the difference between the locations of the first and second centroids to determine the linear displacement d of object 15 between locations X=d1 and X=d2.

Other embodiments of the sensing apparatus are contemplated wherein mirror 125 is oriented such that the reflected image is always focused on the plane of array 40. This operating condition is achieved by locating mirror 125 such that, as the mirror is moved, its center of curvature moves in a straight line passing through light source 20. Alternatively, the light rays emanating from light source 20 can be made parallel and detector array 40 can be placed to coincide with the focal plane of mirror 125.

Operation of the sensing apparatus of the invention is now described in more detail with reference to the sensing apparatus of FIGS. 1 and 2. To determine the linear displacement of moving object 15, the first centroid is determined when mirror 25 of object 15 is at location X=d1. In sensing apparatus 10, optical fibers 45 convey the reflected image through bundle 50 to a two-dimensional array of photo-detectors 55 which function as an imager. An array of charge-coupled devices (CCDs) or charge injection devices (CIDs) may be employed as detector array 55. For example, a CID array having a 512×512 pixel geometry may be employed as detector array 55. There is one-to-one correspondence between the position of the elements or optical fibers 45 of photo-receptor array 40 and the photo-detectors of array 55.

Figure 4:
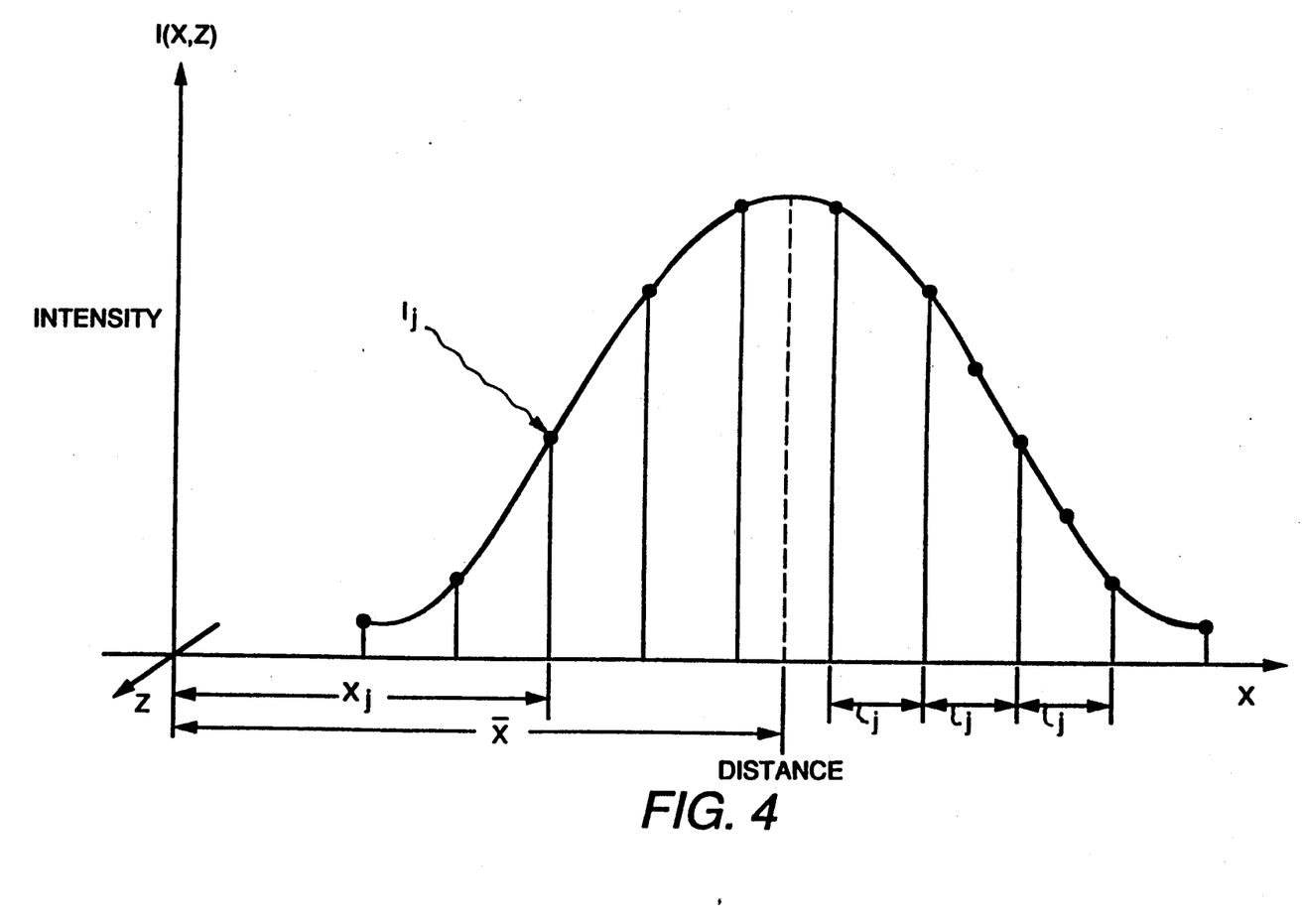
FIG. 4 is a graphical illustration of the light intensity distribution of the reflected image on an optical sensing array in one embodiment of the invention.

The distribution of the reflected image on photo-receptor array 40 appears substantially as shown in the intensity vs. distance graph of FIG. 4, which plots light intensity I of the reflected image as a function of position on the X axis at a given Z location. More specifically, the ordinate of the graph of FIG. 4 shows I(X,Z), the intensity distribution on the plane of the array at location Z=z along optical axis Z, with mirror 25 at point X=x along the X direction which is perpendicular to the optical axis. Thus plane Z=z is the plane that contains the photo-receptors forming array 40. Light intensity samples are taken at regular distance intervals on the X axis of array 40 (which is in the same Cartesian coordinate system as object 15). More specifically, since the optical fibers 45 of array 40 are regularly spaced apart from each other by a distance j, the spacing of the light intensity samples taken by such fibers are correspondingly a distance j apart from each other. These light intensity samples are converted to electrical sample signals, or data, by imager 55. Multiplexer 60 multiplexes these light sample data into a data stream which, after analog-to-digital conversion by A/D converter 70, is processed by processor 75 in the manner now described.

Figure 5:
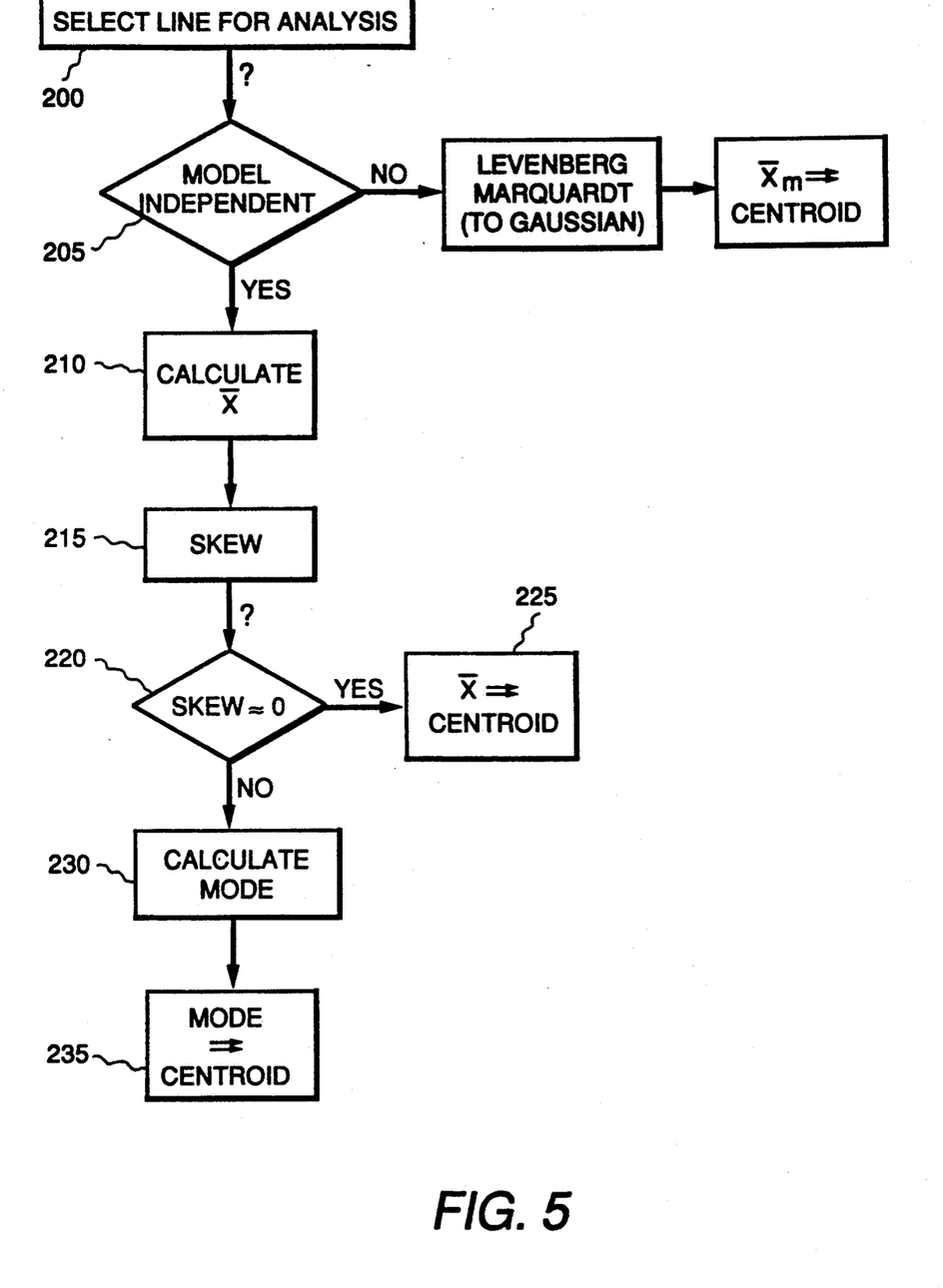
FIG. 5 is a flowchart depicting the steps employed in carrying out the displacement sensing method of the present invention.

FIG. 5 is a flowchart which, considered in conjunction with FIG. 1, depicts the steps carried out by processor 75 of FIG. 1 to actually determine the linear displacement of moving object 15. The measurement of linear displacement is based upon distribution of the intensity I(X,Z) of the reflected image on array 40. For purposes of this flowchart, it is assumed that the intensity distribution of the reflected image on array 40 exhibits a relatively strong central tendency. The intensity distribution is determined when mirror 25 of object 15 is in the X=d1 position and is again determined later when mirror 25 of object 15 is in the X=d2 position.

As an initial step 200, a line is first selected through array 40 along which the intensity profile is to be ascertained. A determination is then made at decision point 205 to learn if the displacement analysis to be conducted is model independent or model dependent. If it is determined that the analysis is model independent, then at step 210, the mean $\bar{x}$, or average, of the intensity distribution on array 40 is generated by processor 75 in accordance with the relationship given by Equation 1 below.

$$\bar{x} = \frac{\int_{-\infty}^{\infty} xI(x,z)}{\int_{-\infty}^{\infty} I(x,z)}$$ Equation 1

When processor 75 performs the calculation of Equation 1, it determines the average or mean $\bar{x}$ of the position of the beam of light reflected onto array 40. Those skilled in the art will recognize that processor 75 will readily perform the calculation specified in Equation 1 in the ideal situation, i.e., one where the reflected light intensity distribution sensed by array 40 is continuous. However, since the intensity distribution is discontinuous in actual practice, due to usage of a discrete and finite number of fiber elements in photo-receptor array 40 and pixels on photo-detector/imager array 55, processor 75 determines the centroid of the reflected image on array 40 by calculating $\bar{x}$ according to Equation 2 at flowchart step 210.

$$\bar{x} = \frac{\sum_j x_j I_j(z)}{\sum_j I_j(z)}$$ Equation 2

In Equation 2, Ij(z) is the intensity distribution of the reflected image on array 40 along the line selected at step 200. Processor 75 performs the calculation set forth in Equation 2 by performing the operations defined in that equation on the intensity data which it receives from photo-detector/imager array 55. As per step 215, processor 75 then calculates the skew of the distribution in accordance with the relationship given in Equation 3.

$$Skew = \frac{\sum_j \left(\frac{x_j - \bar{x}}{\sigma}\right)^3 I_j(z)}{\sum_j I_j(z)}$$ Equation 3

The standard deviation $\sigma$ in Equation 3 is determined by processor 75 performing the calculation of Equation 4 below.

$$\sigma = \frac{\sum_j (x_j - \bar{x})^2 I_j(z)}{\sum_j I_j(z)}$$ Equation 4

Figure 6:
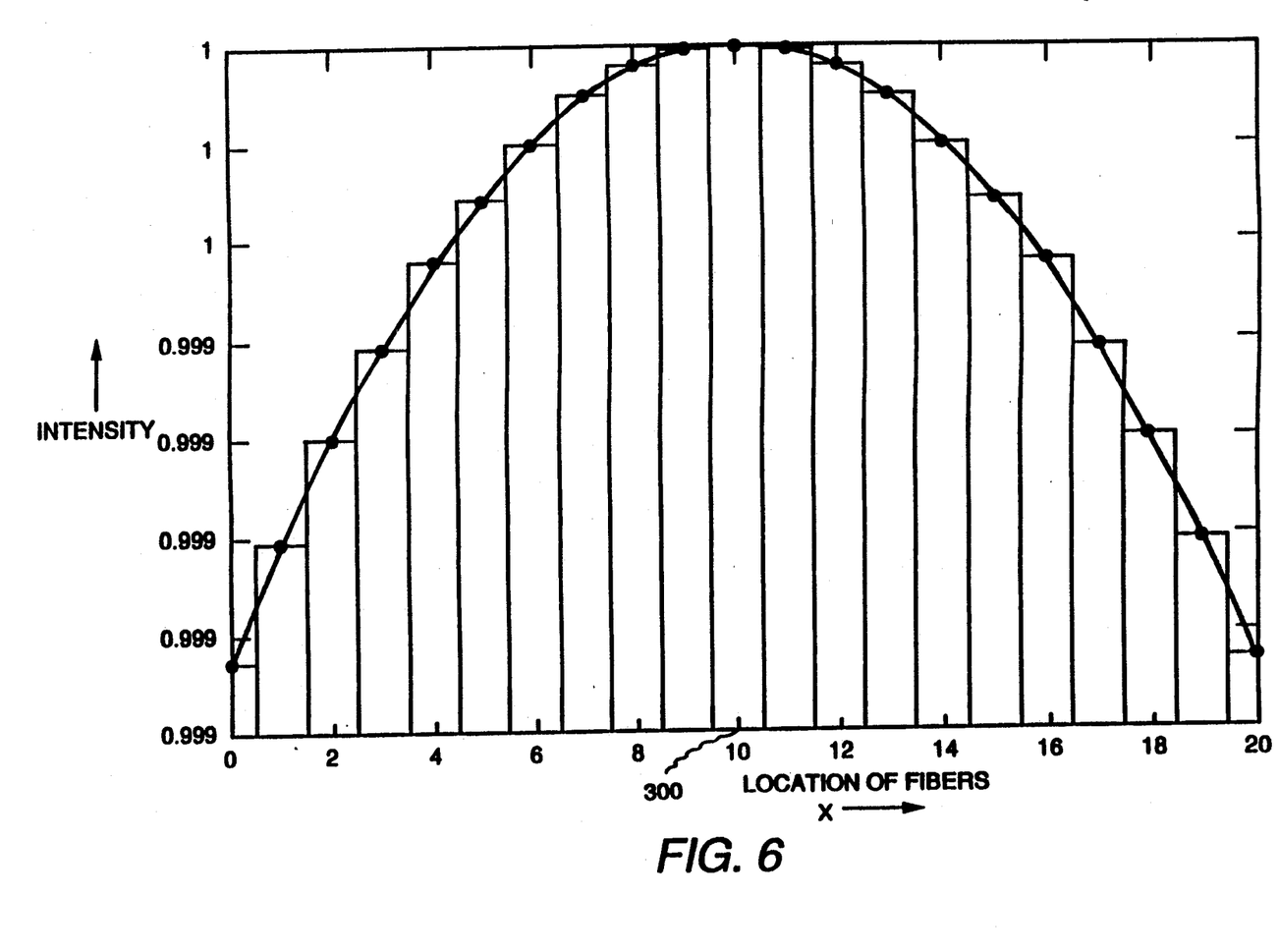
FIG. 6 is a graphical illustration of the reflected light intensity image in circumstances where the intensity distribution of such image is substantially symmetrical.

A test is next performed at decision point 220 to determine if the skew found at step 215 is equal to zero. If the skew at decision point 220 equals zero, then the centroid has been found, as indicated at step 225; namely, the centroid is represented by the calculated $\bar{x}$. More specifically, if the skew is approximately equal to zero, or $(|skew| - \epsilon) \leq 0$, where $\epsilon$ is a tolerance measure, then the centroid is given by the average or mean value $\bar{x}$ as illustrated in the substantially symmetric intensity distribution of FIG. 6. The graph of FIG. 6 depicts intensity of the reflected image on a vertical log scale vs. a horizontal linear scale showing the location of the optical fibers along the selected line of array 40 (FIG. 1), for zero skew. The light intensity distribution in this instance is substantially symmetrical about the center of the line of fibers indicated on the horizontal axis of the graph; that is, the light intensity distribution or beam profile is substantially Gaussian. The centroid of the reflected light image on array 40 is indicated by the center of the light distribution in the Gaussian situation depicted in FIG. 6 so that, for example, the centroid of the reflected light image is indicated at location 300 in FIG. 6.

Figure 7:
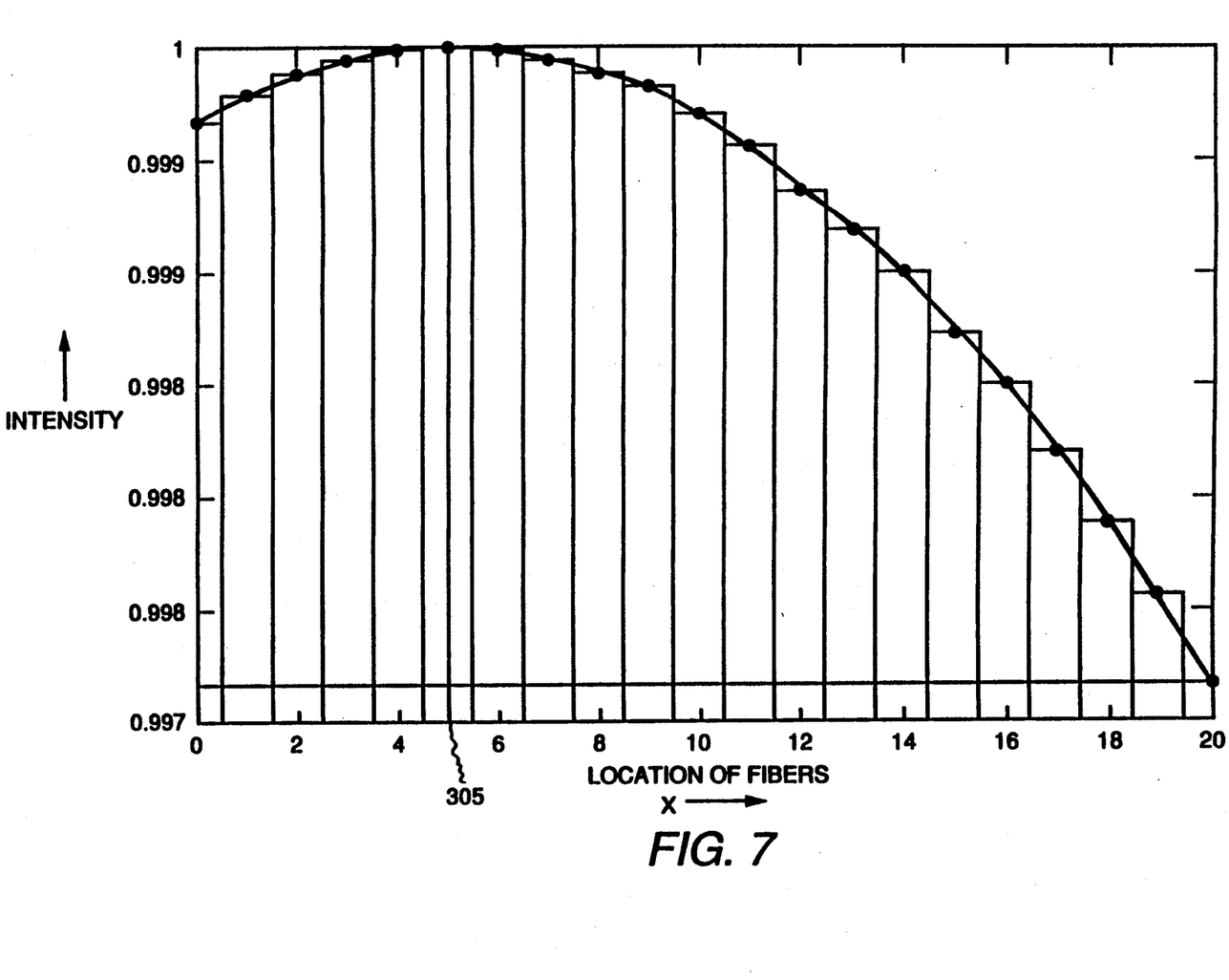
FIG. 7 is a graphical illustration of the reflected light intensity image in circumstances where the intensity distribution of such image is not symmetrical.

If the skew is not equal to zero, the mode is calculated as per step 230. Therefore, when distribution of the reflected light image is not symmetrical, the mode is calculated to determine the value of the position x where the light distribution takes on a maximum value. For example, the graph of FIG. 7 depicts a nonsymmetric or non-Gaussian reflected light image distribution or beam profile. A standard approach for calculating the mode is described in *Basic Statistical Methods*, N. M. Downie and R. W. Health, (New York), Harper and Row, 1965. In the graph of FIG. 7, the centroid is indicated at a location 305 which is the position (i.e., fiber location) along the horizontal axis where the reflected light distribution reaches maximum intensity. Thus, as indicated at step 235, the calculated mode represents the centroid of the reflected image when the skew is other than zero.

If it was determined at decision point 205 that the displacement analysis to be conducted is not model independent (that is, the displacement analysis to be conducted is model dependent) and if the intensity distribution of the reflected image is taken to be Gaussian, then the intensity distribution I(X,Z) can be determined from Equation 5, which is calculated by processor 75.

$$I(x,z) = I_o \exp\left( \frac{-2(x - \bar{x}_m)^2}{w^2(z)} \right) \quad \text{Equation 5}$$

In this instance, the well-known Levenberg-Marquardt method (see, for example, D. W. Marquardt, *J. Soc. Ind. Appl. Math*, Vol. 11, pages 431–441, 1963) can be used by processor 75 to fit to this function. Here $\bar{x}_m$ is the mean value or the centroid of interest, x is the linear displacement of the object along the X axis perpendicular to the direction of propagation z of the reflected beam, and $w^2(z)$ is the Gaussian radius of the reflected beam as set forth below in Equation 6, which is also calculated by processor 75.

$$w(z) = w_o^2 \left[ 1 + \left( \frac{z}{x_R} \right)^2 \right] \quad \text{Equation 6}$$

Those skilled in the art will recognize that $x_R$ is the Raleigh range and is given by Equation 7, which is also calculated by processor 75.

$$x_R = \pi w_o^2 / \lambda \quad \text{(Equation 7)}$$

Figure 8:
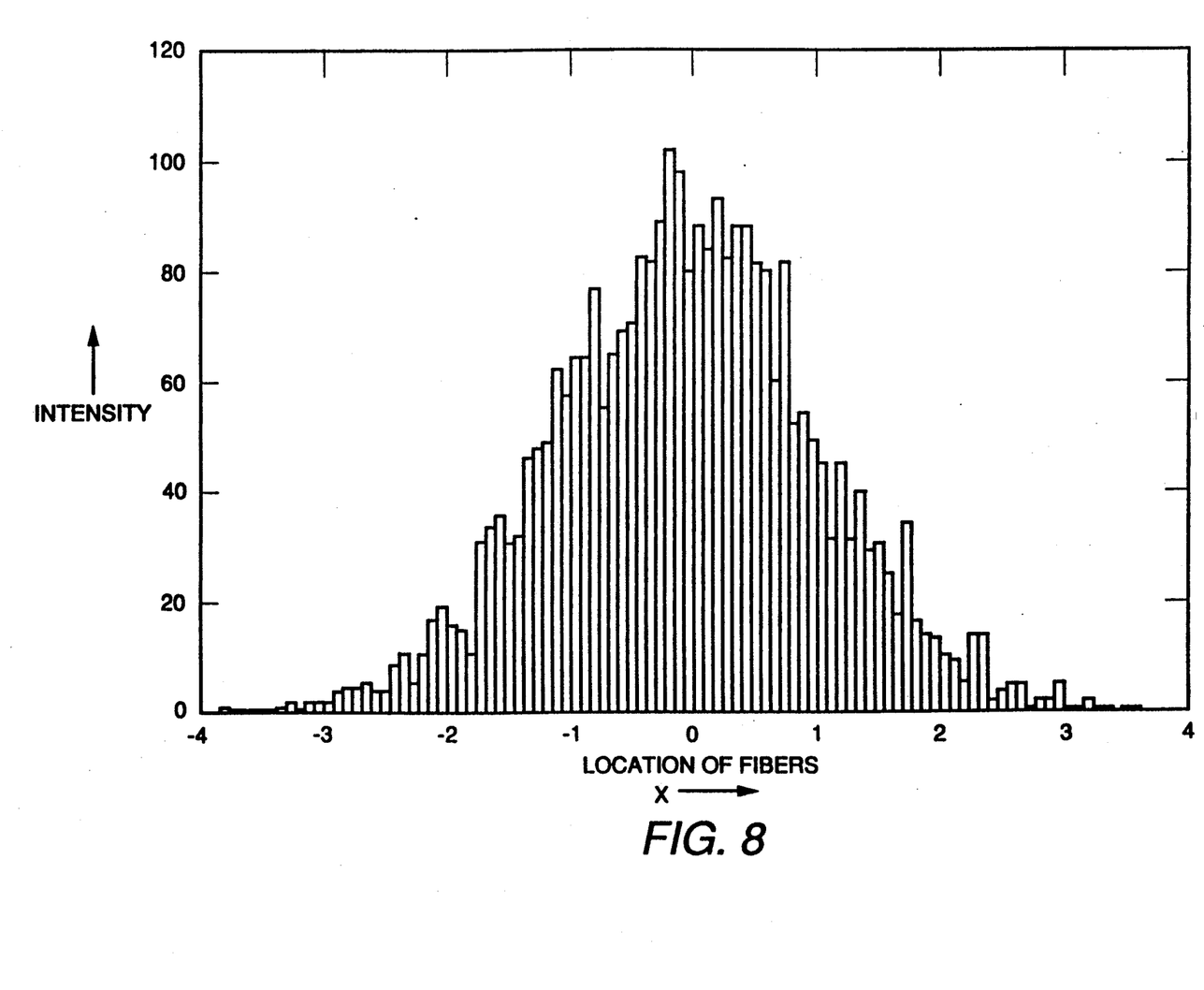
FIG. 8 is a graphical example of an imperfect beam profile of the reflected image.

The above implemented procedure carried out by processor 75 readily provides the mean value of x. Moreover, the Levenberg-Marquardt method can also be employed on non-Gaussian reflected image distributions. The explicit function to be fitted is dictated by the specific beam optics in use. The model independent case and procedure described above is more general and can be employed in circumstances where the light intensity profile of the reflected image is imperfect such as in the intensity profile depicted in the graph of FIG. 8. Reasons for such imperfections in the intensity profile include unequal losses in the various fibers 40 or imperfections in detector/imager array 55.

Whether the particular decision path in the flowchart of FIG. 5 causes centroid calculations to be performed for either the model independent or model dependent case, in either instance a first centroid is determined when the object of interest is in a first position and then a second centroid is determined at a later time when the object has moved to a second position. The linear displacement of the object is the difference between the first and second centroids. Of course, if the object has not moved, then the first and second centroids are identical and there has been no linear displacement. In one embodiment of the sensing apparatus, the centroid is periodically recalculated at predetermined time intervals to monitor motion of the object.

While a sensing apparatus for detecting linear displacement of an object has been described above, it is clear that a method of sensing linear displacement of an object between first and second locations along an axis has also been disclosed. That method includes the steps of providing an incident light beam to a reflector which is fixedly attached to the object so as to reflect the incident light beam onto an array of photo-receptors, determining a first centroid of the reflected light beam on the array of photo-receptors when the object is situated at the first location, determining a second centroid of the reflected light beam on the array of photo-receptors when the object is displaced to the second location, and calculating the displacement of the object between the first and second locations by taking the difference between the first and second centroids.

The foregoing describes an apparatus and method for electro-optically sensing linear displacement of an object of interest. The sensing apparatus of the invention can be used to detect changes in virtually any variable which causes a change in displacement of an object along an axis. For example, the sensing apparatus and method can be used to sense pressure, temperature, rotary motion, and duct Mach number, in addition to detecting displacement changes. The sensing apparatus of the invention desirably measures displacement of an object with high accuracy and with relatively low complexity, size, and weight. Processor 75 of FIG. 1, which may be any of the well-known types of microcomputers, may be programmed to provide signals indicative of temperature, pressure and velocity changes, based upon object displacement or growth, using well-known relationships. Because the sensing apparatus employs optical techniques, it is substantially resistant to electromagnetic interference (EMI), can perform with high reliability in harsh operating environments, and is substantially resistant to contamination.

While only certain preferred features of the invention have been shown by way of illustration, many modifications and changes will occur to those skilled in the art. It is, therefore, to be understood that the present claims are intended to cover all such modifications and changes which fall within the true spirit of the invention.

What is claimed is:

1. A sensing apparatus for detecting linear displacement of an object between first and second locations along an axis, said sensing apparatus comprising:

a light source for projecting an incident light beam along an incident light path to said object;

a reflector affixed to said object to reflect said light beam along a reflective light path;

a photo-receptor array comprising an x-y matrix of photo-sensor elements located in said reflective light path and sufficiently closely spaced such that the reflected light beam impinges on a grouping of said photo-sensor elements of said array;

centroid determining means coupled to said photo-receptor array for determining a first centroid of said reflected light beam impinging on a first group of said photo-sensor elements of said photo-receptor array when said object is situated at said first location and for determining a second centroid of said reflected light beam impinging on a second group of said photo-sensor elements of said photo-receptor array when said object is displaced to said second location; and processor means responsive to said centroid determining means for calculating the displacement of said object between said first and second locations by determining the difference between said first and second centroids.

2. The sensing apparatus of claim 1 where said photo-receptor array extends in a direction parallel to a direction of linear displacement of the object, the array including a first plurality of photo-receptors arranged such that a second plurality of photo-receptors contained within said first plurality of photo-receptors is illuminated by said reflected light beam regardless of the position of the object between said first and second locations along said axis.

3. The sensing apparatus of claim 2 wherein said processor means includes means for converting said displacement to a corresponding value of change in a variable taken from the group consisting of pressure, temperature, and velocity.

4. The sensing apparatus of claim 1 wherein said light source is located such that said incident light beam is substantially parallel with said axis.

5. The sensing apparatus of claim 1 wherein said photo-receptor array comprises a bundle of optical fibers having common ends arranged in said x-y matrix, said sensing apparatus further comprising an imager including an array of pixel-indicating elements coupled to said optical fibers, each optical fiber being coupled to a respective pixel-indicating element of said imager array such that said imager can provide electrical signals representative of intensity of a portion of the reflected light beam impinging on said photo-receptor array.

6. The sensing apparatus of claim 5 further comprising an array of pixel-indicating elements coupled to said optical fibers so as to provide one-to-one correspondence between the position of the ends of said fibers in said x-y matrix and a position of said pixel-indicating elements.

7. The sensing apparatus of claim 1 wherein each element of said photo-receptor array can generate an optical signal representative of intensity of a portion of the reflected light beam impinging thereon.

8. The sensing apparatus of claim 7 including an array of photo-detectors, and a bundle of optical fibers, each one of said fibers coupling a separate one of said photo-sensor elements to a separate one of said photo-detectors such that one-to-one correspondence is established between the positions of the photo-sensor elements and the photo-detectors in their respective arrays.

9. The sensing apparatus of claim 1 wherein said reflector comprises a plane mirror.

10. The sensing apparatus of claim 1 wherein said reflector comprises a spherical mirror.

11. A method of sensing linear displacement of an object between first and second locations along an axis comprising the steps of:
providing an incident light beam to a reflector affixed to said object such that said reflector reflects said light beam onto a grouping of photo-receptors in a two-dimensional array of photo-receptors;
determining a first centroid of the reflected light beam on a first group of said photo-receptors of said array of photo-receptors when said object is situated at said first location;
determining a second centroid of the reflected light beam on a second group of said photo-receptors of said array of photo-receptors when said object is displaced to said second location; and
calculating the displacement of said object between said first and second locations by determining the difference between said first and second centroids.

12. A method of sensing linear displacement of an object along an axis comprising the steps of:
affixing a mirror to said object such that when said object is displaced along said axis from a first location to a second location said mirror also moves along said axis;
providing a light beam from a stationary source to said mirror such that said light beam is reflected by said mirror onto a grouping of photo-receptors in a two-dimensional array of photo-receptors;
determining a first centroid of the light beam on a first group of said photo-receptors of said array of photo-receptors when said object is situated at said first location;
determining a second centroid of said light beam on a second group of said photo-receptors of said array of photo-receptors when said object is displaced to said second location; and
calculating the displacement of said object between said first and second locations by determining the difference between said first and second centroids.

13. A method of sensing linear displacement of an object between first and second locations along an axis, said method comprising the steps of:
projecting a light beam onto said object, said light beam being projected along an incident light path;
reflecting said light beam from a mirror affixed to said object and situated in said incident path, said light beam being reflected along a reflective light path;
intercepting the reflected light beam with a two-dimensional array of photo-receptors situated in said reflective light path, such that said reflected light beam impinges on a grouping of photo-receptors in said two-dimensional array;
determining a first centroid of said reflected light beam impinging on a first group of said photo-receptors of said array of photo-receptors when said object is situated at said first location;
determining a second centroid of said reflected light beam impinging on a second group of said photo-receptors of said array of photo-receptors when said object is displaced to said second location; and
calculating the displacement of said object between said first and second locations by determining the difference between said first and second centroids.

* * * * *